United States Patent
Wang et al.

(10) Patent No.: US 12,238,126 B2
(45) Date of Patent: Feb. 25, 2025

(54) SYSTEMS AND METHODS FOR LEARNING-BASED HIGH-PERFORMANCE, ENERGY-EFFICIENT, AND SECURE ON-CHIP COMMUNICATION DESIGN FRAMEWORK

(71) Applicant: The George Washington University, Washington, DC (US)

(72) Inventors: Ke Wang, Alexandria, VA (US); Hao Zheng, Arlington, VA (US); Ahmed Louri, Vienna, VA (US)

(73) Assignee: The George Washington University, Washington, DC (US)

( * ) Notice: Subject to any disclaimer, the term of this patent is extended or adjusted under 35 U.S.C. 154(b) by 927 days.

(21) Appl. No.: 17/307,563

(22) Filed: May 4, 2021

(65) Prior Publication Data

US 2021/0342690 A1 Nov. 4, 2021

Related U.S. Application Data

(60) Provisional application No. 63/019,720, filed on May 4, 2020.

(51) Int. Cl.
*H04L 67/12* (2022.01)
*G06F 18/21* (2023.01)
(Continued)

(52) U.S. Cl.
CPC ........ *H04L 63/1425* (2013.01); *G06F 18/217* (2023.01); *G06N 3/04* (2013.01);
(Continued)

(58) Field of Classification Search
CPC . H04L 63/1425; H04L 63/1441; H04L 67/12; H04L 67/56; G06F 18/217;
(Continued)

(56) References Cited

U.S. PATENT DOCUMENTS 9,015,093 B1 * 4/2015 Commons .......... G01C 21/3602
706/26
10,284,530 B1 * 5/2019 Kuo .................. G06F 21/85
(Continued)

FOREIGN PATENT DOCUMENTS

CA 3011474 A1 * 2/2019 ......... G06Q 10/0639
CA 3030125 A1 * 7/2019 ........... G06F 3/0325
(Continued)

OTHER PUBLICATIONS

T. H. Boraten, et al., "Securing NoCs Against Timing Attacks with Non-Interference Based Adaptive Routing", Twelfth IEEE/ACM International Symposium on Networks-On-Chip (NOCS), 2018, 8 pgs.
(Continued)

*Primary Examiner* — Steven P Sax
(74) *Attorney, Agent, or Firm* — BLANK ROME LLP (57) ABSTRACT

Systems and methods are disclosed for improving on-chip security, while minimizes the latency and cost of security techniques to improve system-level performance and power simultaneously. The framework uses machine learning algorithms, such as an artificial neural network (ANN), for runtime attack detection with higher accuracy. Further, a learning-based attack mitigation method using deep reinforcement learning is disclosed, where the method may be used to isolate the malicious components and to optimize network latency and energy-efficiency.

17 Claims, 6 Drawing Sheets

(51) Int. Cl.
  *G06N 3/04* (2023.01)
  *G06N 3/08* (2023.01)
  *H04L 9/40* (2022.01)
(52) U.S. Cl.
  CPC ........... *G06N 3/08* (2013.01); *H04L 63/1441* (2013.01); *H04L 67/12* (2013.01); *G05B 2219/25198* (2013.01)
(58) Field of Classification Search
  CPC .......... G06F 2213/0038; G06F 15/781; G06F 2115/02; G06N 3/04; G06N 3/08; G06N 20/00; G06N 20/10; G06N 20/20; G05B 2219/25198; H01L 224/48135
  See application file for complete search history.

(56) References Cited

U.S. PATENT DOCUMENTS

| | | | | |
|---|---|---|---|---|
| 2004/0078568 | A1* | 4/2004 | Pham | G06F 21/6218 |
| | | | | 713/165 |
| 2009/0282483 | A1* | 11/2009 | Bennett | H04L 63/1416 |
| | | | | 726/23 |
| 2020/0067637 | A1* | 2/2020 | Wang | H03M 13/09 |
| 2021/0014198 | A1* | 1/2021 | Amoudi | H04L 63/0236 |

FOREIGN PATENT DOCUMENTS

| | | | | | |
|---|---|---|---|---|---|
| CA | 3089858 | A1 | * | 8/2019 | ............... E04H 4/14 |
| CA | 3119790 | A1 | * | 5/2020 | ........... G06F 21/554 |
| CN | 107545194 | A | * | 1/2018 | |
| CN | 109587056 | A | * | 4/2019 | |
| CN | 106656808 | B | * | 8/2019 | |
| CN | 110460545 | A | * | 11/2019 | ........... H04L 49/109 |
| CN | 111131335 | A | * | 5/2020 | ............. G06N 20/00 |
| CN | 111143847 | A | * | 5/2020 | ............. G06F 17/18 |
| CN | 111314296 | A | * | 6/2020 | |
| CN | 111131335 | B | * | 8/2020 | ............ G06N 20/00 |
| CN | 111522775 | B | * | 5/2023 | ......... G06F 15/7825 |
| JP | 2016111664 | A | * | 6/2016 | ........ H04L 63/1433 |

OTHER PUBLICATIONS

H. M. G. Wassel, et al., "SurfNoC: A Low Latency and Provably Non-Interfering Approach to Secure Networks-On-Chip", ACM SIGARCH Computer Architecture News 41, No. 3, 2013; 12 pgs.

* cited by examiner

SYSTEMS AND METHODS FOR LEARNING-BASED HIGH-PERFORMANCE, ENERGY-EFFICIENT, AND SECURE ON-CHIP COMMUNICATION DESIGN FRAMEWORK

CROSS-REFERENCE TO RELATED APPLICATIONS

This application claims the benefit of priority of U.S. Application Ser. No. 63/019,720 filed May 4, 2020, the content of which is relied upon and incorporated herein by reference in its entirety.

GOVERNMENT LICENSE RIGHTS

This invention was made with government support under National Science Foundation, CCF-1547035, CCF-1702980. The government has certain rights in the invention.

FIELD OF THE DISCLOSURE

The field of the disclosure relates to interconnect architecture for parallel computing systems (i.e., multicore processors, many cores, heterogeneous systems, etc.), and more specifically but not exclusively relates to on-chip communication and more specifically to a secure, high-performance, and energy-efficient network-on-chip (NoC) architecture for parallel computing systems.

BACKGROUND OF THE DISCLOSURE

Network-on-chips (NoCs) are becoming increasingly critical yet vulnerable to various security threats. One prevalent security threat for NoCs comes from maliciously implanted Hardware Trojans ("HTs"). HTs are inserted alterations and modifications to the original circuitry that exploit hardware mechanisms to access the sensitive data on chips. Once activated, HTs attack NoCs by injecting transient faults in transmitted flits/packets, causing misrouting and unnecessary packet re-transmissions. These re-transmission messages consume massive NoC resources (e.g., link and buffer) and saturate the transmission channels, resulting in significant performance degradation or even a denial of service.

As the market for parallel computing is growing rapidly, the amount of shared resources (processors, memory, sensors, etc.) has increased. Network-on-chips ("NoCs"), as the standard, interconnect fabric solutions for connecting these shared resources, are playing a critical role. However, NoC is vulnerable to attacks that steal sensitive data or damage software/hardware systems. Unfortunately, conventional detection techniques occasionally cause false/miss detection, which leads to penalties in terms of additional power consumption and increased network latency. Moreover, conventional isolation techniques limit the network throughput, forbid communication via certain channels, and detour the packets to avoid infected regions, thus inevitably incur performance degradation.

Existing techniques protect NoC by detecting and isolating the HT-infected NoC components (routers and links). In the HT-detection aspect, the existing works use fault history logging, runtime threshold monitoring (RTM) on link-error/packet-injection rates, or built-in self-testing hardware. These techniques monitor fault-related NoC attributes (e.g., temperature and buffer/link utilization) at runtime and label the corresponding component as HT-infected if any of the attribute values exceed a manually set threshold. However, since massive NoC attributes are correlated with transient faults and interact with each other, designing the thresholds for detecting HT is complicated. These thresholds, if selected carelessly, can cause false detection and misdetection, additional power consumption, and increased network latency. In the HT-isolation aspect, conventional solutions use regional routing algorithms to isolate the HT-infected components. Unfortunately, these techniques limit the network throughput, forbid communication via certain channels, and detour the packets to avoid infected regions. This inevitably increases network latency. Therefore, the challenge is to design a secure architecture that promptly and accurately detects and isolates HTs with minimal performance loss. Conventional techniques such as non-interference based adaptive routing (NIBR) and "SurfNOC" (as listed in FIGS. 6A-6C below) are discussed in the following articles, which are incorporated by reference in their entirety: T. H. Boraten and A. K. Kodi, "Securing NoCs Against Timing Attacks with Non-Interference Based Adaptive Routing," 2018 Twelfth IEEE/ACM International Symposium on Networks-on-Chip (NOCS), 2018, pp. 1-8, doi: 10.1109/NOCS.2018.8512166; and Hassan MG Wassel, Ying Gao, Jason K. Oberg, Ted Huffmire, Ryan Kastner, Frederic T. Chong, and Timothy Sherwood. "Surfnoc: A low latency and provably non-interfering approach to secure networks-on-chip." ACM SIGARCH Computer Architecture News 41, no. 3 (2013): 583-594.

The present disclosure presents a solution to use machine learning (ML)-based methodology to achieve enhanced HT detection and mitigation with improved performance and power. Simulation results show that our system achieves up to 97% HT-detection accuracy, 67% improved energy-efficiency, and 28% reduced network latency as compared to state-of-the-art HT-mitigation techniques.

SUMMARY OF THE DISCLOSURE

The objectives of this disclosure include (1) improving the HT detection accuracy of the interconnect architectures; (2) protecting NoC system by dynamically isolating HT-infected routers; and (3) improving network performance and power with power-gating and router bypassing.

The disclosure presents an enhanced router architecture with a learning-based per-router HT-detection module using an artificial neural network (ANN), bypass channel, and a deep reinforcement learning (DRL)-based controller for HT-isolation, thus simultaneously optimizing performance, energy-efficiency, and security. Specifically, the TSA-NoC, a learning-based, high-performance, and energy-efficient NoC design for securing on-chip communication. In TSA-NoC, we enhance the router architecture with a learning-based per-router HT-detection (DetectANN) module, bypass channel, and a SmartRoute controller for HT-isolation. DetectANN uses an artificial neural network (ANN) to automatically identify HT-injected faults by recognizing abnormal network behaviors and improve the accuracy of HT-detection. After HT-detection, the routers are dynamically categorized into HT-free and HT-infected routers.

A low-cost bypass channel using simple switch logic is created to bypass the HT-infected routers while maintaining network connectivity. To balance traffic-loads among low-throughput bypass channels and high-throughput routers and improve the overall network performance, SmartRoute controller uses deep reinforcement learning (DRL) to handle diverse traffic patterns by dynamically applying the most suitable routing algorithms thus minimizing network latency and power consumption. The router is designed to improve on-chip communication for parallel computing systems (multi-core CPU, GPU, FPGA, TPU, etc.).

In certain embodiments, a router has an input port, an output port, a dynamic error detection and correction circuit, an artificial neural network module, and a controller. In such an embodiment, the controller instructs the artificial neural network module to detect malicious circuit modifications in a router.

In other embodiments, the system has one or more processing cores and one or more routers, where each of the routers is comprised of an input port, and output port, a dynamic error detection and correction circuit, a bypass channel, an artificial neural network module, and a controller. In operation, the controllers instruct the artificial neural network modules of the routers to detect malicious circuit modifications in the one or more routers as the artificial neural network module receives data packets from the input ports.

In yet other embodiments, the method comprises receiving one or more data packets from an input port at the artificial neural network module of one or more routers, where each router is comprised of a controller. In such an implementation, the artificial neural network module of each router is trained to detect malicious circuit modifications prior to installation. The artificial neural network module of each router analyzes runtime attributes of the data packets and identifies malicious circuit modifications from those runtime attributes. The controllers of the routers then transmit an instruction to use the bypass channels to isolate routers in which the malicious circuit modifications are detected.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In describing a preferred embodiment of the disclosure illustrated in the drawings, specific terminology will be resorted to for the sake of clarity. However, the disclosure is not intended to be limited to the specific terms so selected, and it is to be understood that each specific term includes all technical equivalents that operate in a similar manner to accomplish a similar purpose. Several preferred embodiments of the disclosure are described for illustrative purposes, it being understood that the disclosure may be embodied in other forms not specifically shown in the drawings.

Figure 1:
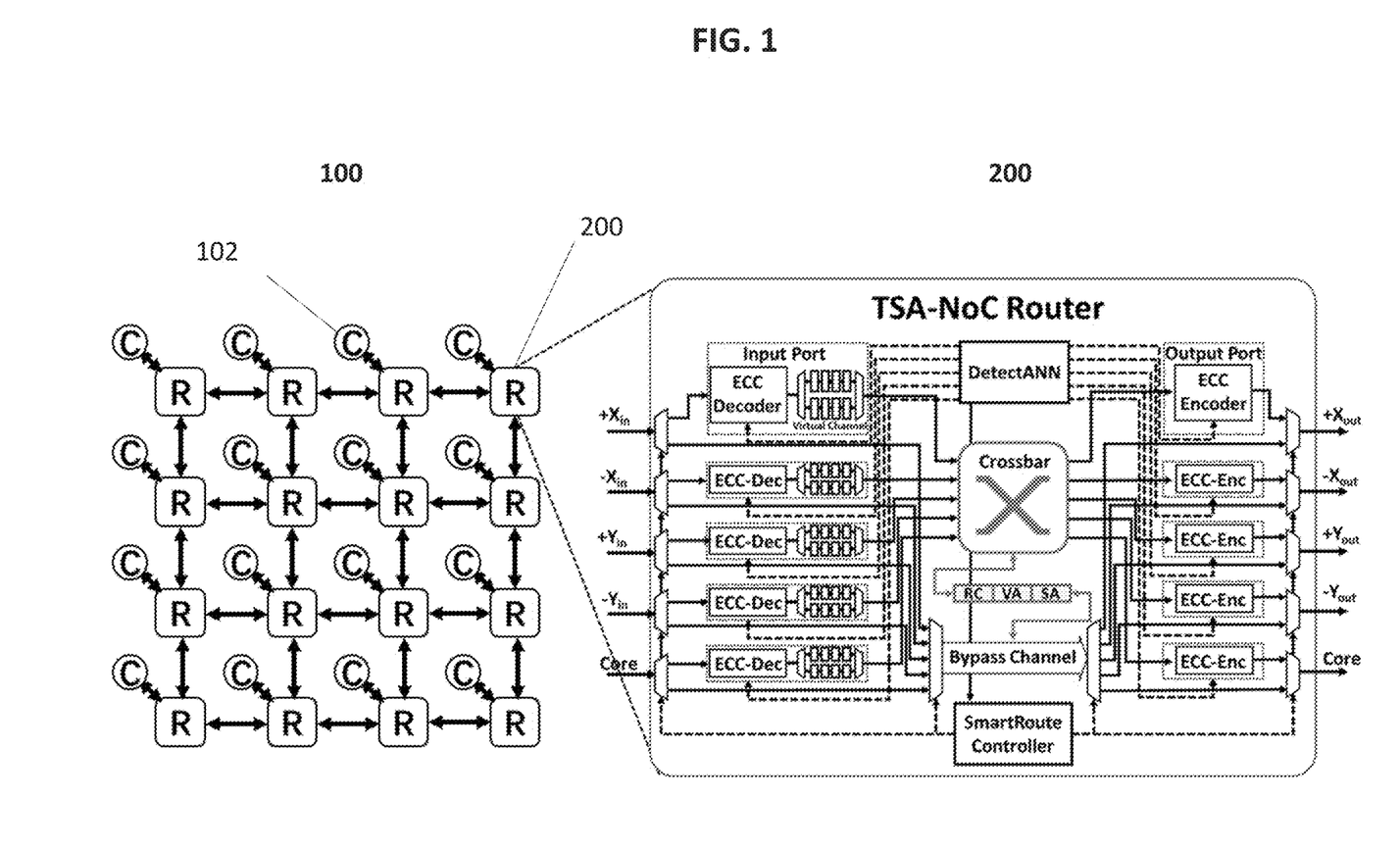
FIG. 1 illustrates an exemplary embodiment of the TSA-NoC router in an example 4*4 2D mesh network-on-chip (NoC) system. The routers are shown as "R", and the processing cores are shown as "C"

Described herein are embodiments of TSA-NoC, a learning-based HT-detection and mitigation framework for secure NoC architecture. FIG. 1 illustrates an exemplary embodiment of the TSA-NoC router in an example 4*4 2D mesh netwok-on-chip (NoC) system. The routers are shown as "R" 200, and the processing cores are shown as "C" 102.

Figure 2:
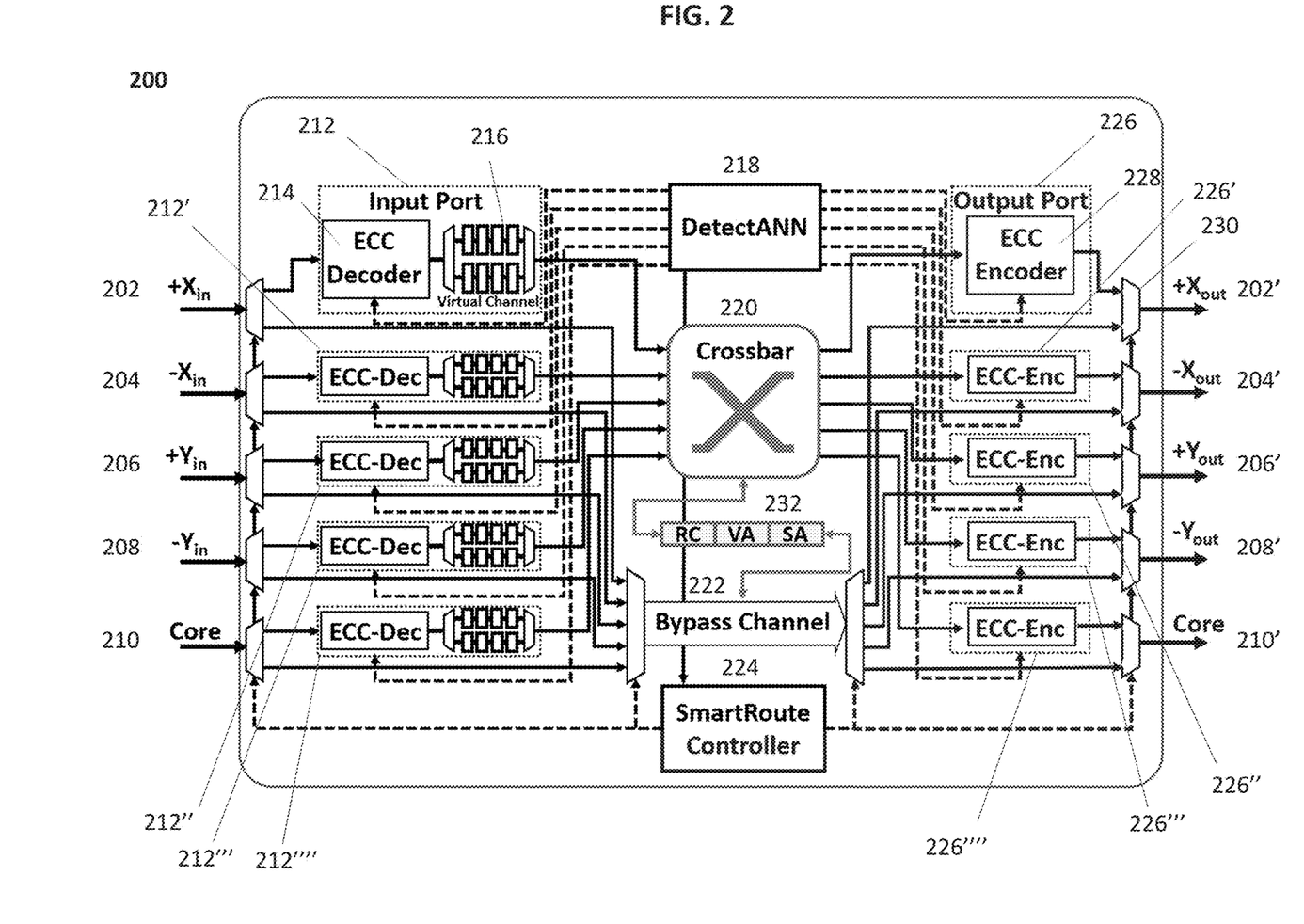
FIG. 2 illustrates a TSA-NoC router architecture. The router is comprised of a DetectANN design for HT-detection, a bypass channel for HT-isolation, and a SmartRoute controller. Solid and dashed arrows represent data paths and control signals, respectively.

An enhanced router 200 architecture for TSA-NoC in accordance with an exemplary embodiment is shown in FIG. 2. In the diagram, solid and dashed arrows represent data paths and control signals, respectively. The exemplary router has four inputs 202, 204, 206, 208 and four outputs 202', 204', 206', 208' as well as a core input 210 and a core output 210'. Each of the inputs and the core input has an input port. A crossbar 220 switch acts as a switch matrix to connect the inputs 202, 204, 206, 208, 210 to the outputs 202', 204', 206', 208', 210'. As shown in FIG. 2, "RC/VA/SA" 232 comprise logic circuitry for router pipelining, which forms a connection between the crossbar 220 and the bypass channel 222. "RC" refers to routing computation, "VA" refers to virtual channel allocation, and "SA" refers to switch allocation.

Each of the inputs 202, 204, 206, 208, 210 is transmitted to a corresponding input port 212, 212', 212", 212''', 212''''. Each input port 212, 212', 212", 212''', 212'''' is comprised of a dynamic error detection and correction ("ECC") decoder 214 and a virtual channel 216. The ECC decoder 214 is preferably configured to be partially activated or deactivated, and configured to perform different fault-tolerant methodologies known in the art such as CRC (cyclic redundancy code), SECDED (single error correction double error detection code), DECTED (double-bit error correction and triple-bit error detection code), etc. The virtual channel 216 is configured to avoid both protocol and routing deadlocks.

The input ports 212, 212', 212", 212''', 212'''' are connected to an artificial neural network ("ANN") (DetectANN) 218 module, a bypass channel 222, and an enhanced HT-mitigation mechanism (SmartRoute) controller 224 to improve network performance with deep reinforcement learning ("DRL"). The DetectANN 218 module uses an artificial neural network to automatically identify HT-injected faults by recognizing abnormal network behaviors and improve the accuracy of HT-detection. The DetectANN 218 module can use several machine learning algorithms, such as convolutional neural networks (CNN), deep neural networks (DNN), generative adversarial networks (GAN) to accurately identify HT-injected faults. The DetectANN 218 module may be trained prior to its implementation in the system and may be shared across multiple routers 200.

In one embodiment, the bypass channel 222 has one or more bypass links and is configured to dynamically route a portion of packets with high security requirement without traversing HT-infected routers and utilize the bypassed routers to propagate other packets without degrading network performance. The HT-infected router refers to routes in which one or more HTs have been implanted. Such HT-infected routers will inject faults to the data packets maliciously. The SmartRoute controller 224 automates hardware reconfiguration (e.g., bypassing, dynamic ECC hardware, and routing) to achieve optimal network power, latency, and security. In certain embodiments, to balance traffic-loads among low-throughput bypass channels 222 and high-throughput routers and improve the overall network performance, the SmartRoute controller 224 uses deep reinforcement learning (DRL) to handle diverse traffic patterns by dynamically applying the most suitable routing algorithms thus minimizing network latency and power consumption. If the router 200 is detected to be HT-infected, the bypass channel 222 of that router 200 is activated, and packets will be propagated using the bypass channels 222.

Data from each input port 212, 212', 212", 212''', 212'''' is transmitted through the DectectANN 218 to its corresponding output port 226, 226', 226", 226''', 226''''. Each of the output ports 226, 226', 226", 226''', 226'''' is comprised of an ECC encoder 228, which corresponds to the ECC decoder 214 of each of the input ports 212, 212', 212", 212''', 212''''. The ECC encoder 228 is preferably configured to be partially activated or deactivated, and configured to perform different fault-tolerant methodologies known in the art such as CRC (cyclic redundancy code), SECDED (single error correction double error detection code), DECTED (double-bit error correction and triple-bit error detection code), etc. The ECC encoder 228 and the ECC decoder 214, together, form an ECC circuit. In certain embodiments, the SmartRoute controller 224 provides a signal to configure the selector 230, so that the selector 230 only selects one output. If output from the output port 226 is selected, the packets are propagated using the router 200. If the outputs of the bypass channel 222 are selected, then the packet is propagated using the bypass channel 222. The selection between the output port 226 and the bypass channel 222 depends on whether the router 200 is HT-infected, and if the router 200 needs to be bypassed.

Figure 3:
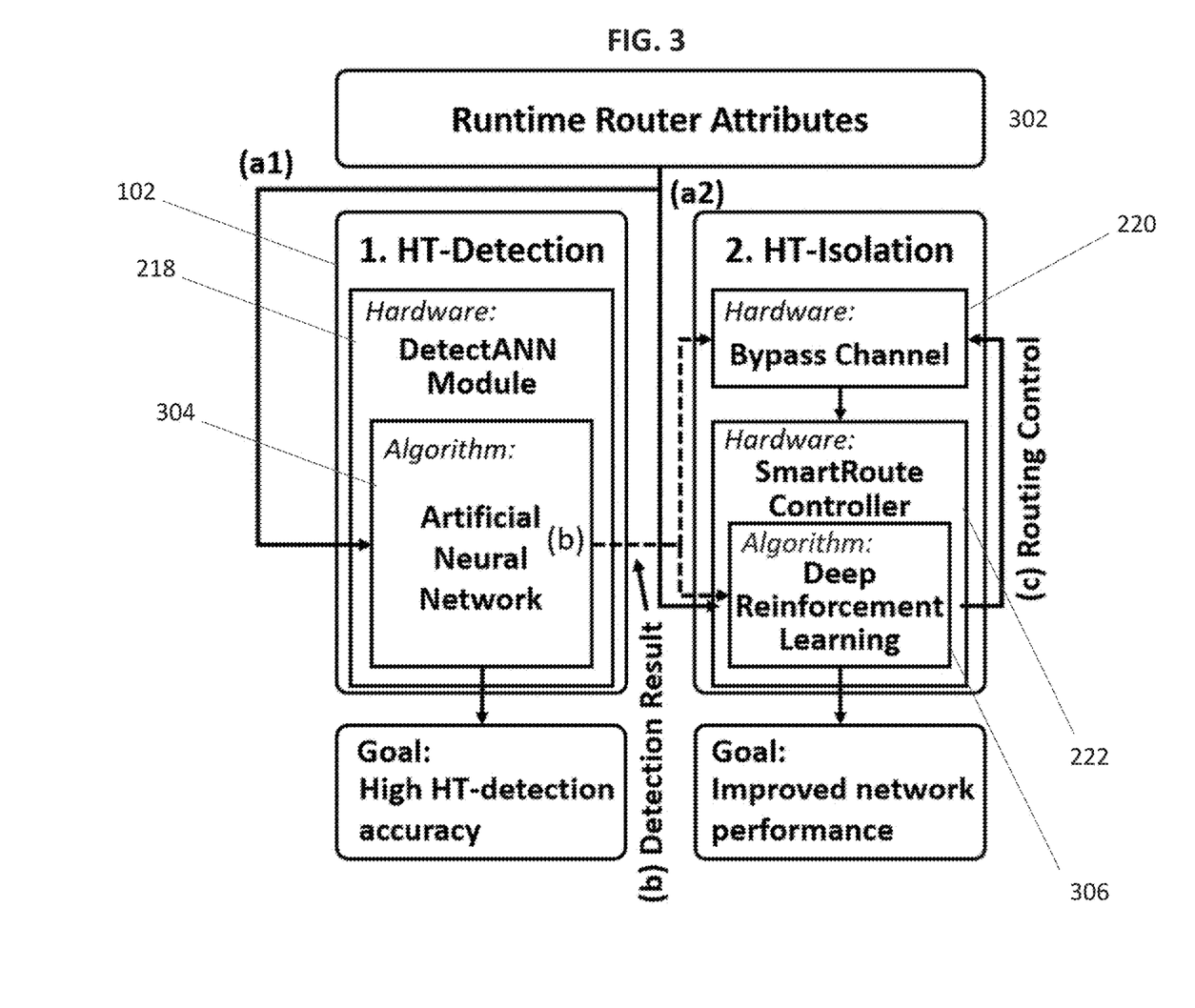
FIG. 3 shows the overview of the TSA-NoC framework.

FIG. 3 shows the overview of the TSA-NoC framework as a diagram that incorporates exemplary hardware and software. The diagram is broken into the HT-detection components and HT-isolation components of an exemplary embodiment of the router. The HT-detection components are comprised of the DetectANN 218 module, which monitors network attributes, learns from runtime network activities, and automatically detects HT-infected components by recognizing abnormal network behaviors at a high level of accuracy.

As shown in the diagram of FIG. 3, the runtime router attribute values 302 (e.g., buffer utilization, link utilization, temperature, etc.) are first fed into the DetectANN 218 module as inputs (a1). The DetectANN 218 module is comprised of an artificial neural network algorithm 304 that then uses the inputs to calculate an output showing if the router is HT-infected. The detection result (b) is sent to the bypass controller to power-off the infected router. At the same time, the attribute values (a2) and detection result (b) are sent to the SmartRoute controller 224, which is one of the components of the HT-isolation mechanism. The SmartRoute controller 224 then uses a machine learning algorithm 306 to automatically configure the suitable routing algorithm to be applied (c). In certain embodiments, the machine learning algorithm 306 is a deep reinforcement learning algorithm. The routers communicate a detection of HT infection to each other as follows. Each router 200 has a DetectANN module 218, and the routers' local DetectANN module 218 only determines whether the local router 200 is HT-infected. If that router 200 is determined to be HT-infected, the bypass channel 222 will be activated. The determination of HT-infection made by the local DetectANN module 218 is typically not sent to other routers.

The SmartRoute controller 224 categorizes packets into those whose source and destination nodes are HT-free (high-security packets) and ones whose source and/or destination nodes are HT-infected (low-security packets). Routers 200 are marked as HT-free or HT-infected. Packets which are sent from or sent to HT-infected routers are called "low-security packets," and all other packets are considered "high-security packets." For high-security packets, all the components in the transmission path should be HT-free for security, while the transmission paths of the latter packets are allowed to contain HT-infected nodes. To isolate the HT-infected routers to protect the high-security packets, a bypass channel 222 is created to bypass the HT-infected routers while maintaining network connectivity. Since the simple switch logic of the bypass channel 222 inevitably degrades the network throughput, a routing mechanism that avoids transmitting intense traffic through bypass channels 222 should be applied. As used herein, "intense traffic" means "traffic that can saturate the bypass channel and cause congestion." Moreover, to better utilize network resources, especially the isolated routers, a different routing algorithm may be needed for the low-security packets.

Three exemplary routing algorithms may be used. (1) O1TURN, where packets can select between XY routing, meaning traveling in horizontal directions first then traveling vertically, and YX according to network congestion conditions; (2) West-First, where if the destination is on the west side of the source, the packet must go west first, with no other restrictions; and (3) Negative-First, where if the destination is on the negative side (south or west) of the source, the packet must go to the negative side first, with no other restrictions. To that end, the SmartRoute controller 224 is used, which proactively selects the most suitable routing algorithm to balance traffic-loads in the low-throughput bypass channel 222 and high-throughput routers, respectively, and improve overall network performance.

Figure 4:
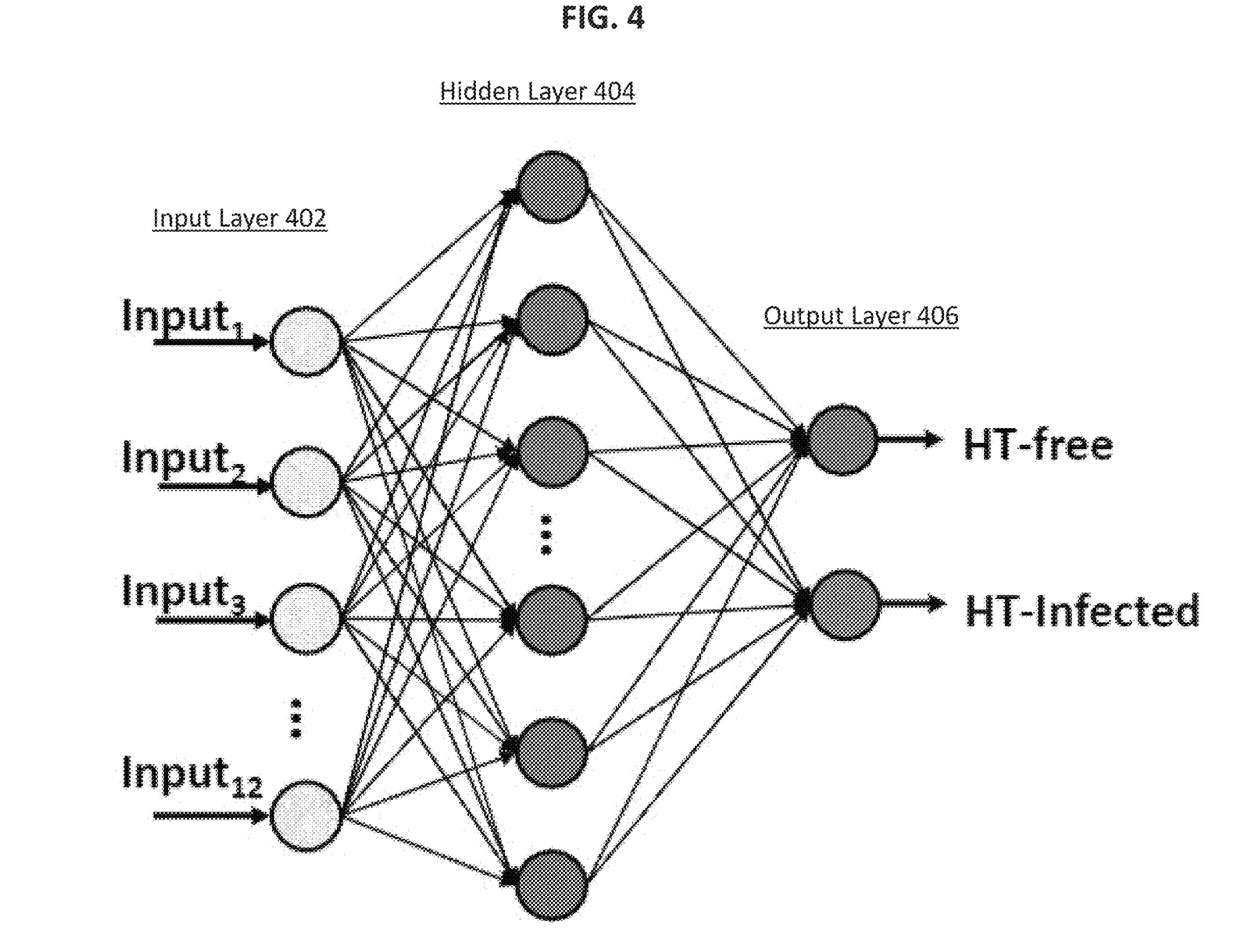
FIG. 4 illustrates the neural network structure used by DetectANN.

The structure the neural network structure used by DetectANN 218 in accordance with one example embodiment is shown in FIG. 4. A per-router DetectANN 218 is implemented to perform runtime HT-detection with improved accuracy, minimal timing, and power overheads. Unlike the static thresholds used by FHL and RTM, DetectANN 218 eschews human engineering, monitors NoC attributes, and automatically detects HTs by learning how to accurately recognize the abnormal behavior(s) of the local router through complex and interrelated NoC attributes. "FHL" refers to "fault history logs," which is a very basic and common detection method. That method records when and where the transient faults occur in the past, and these faults can then be used in the future if the fault occurs multiple times (usually 3) at the same router within a certain time period.

If DetectANN 218 detects an HT, the router will be marked as an HT-infected router. A non-inclusive list of monitored NoC attributes includes buffer utilization (number of occupied virtual channels) for each input port (+x, −x, +y, −y, and local core), link utilization (value of input-flits per cycle) for each input port (+x, −x, +y, −y, and local core), local operation temperature, and the previous transient error rate]. Since HTs are difficult to detect when dormant, to identify activated HTs in a timely manner while reducing the computational overhead of DetectANN 218, HT-detection is performed iteratively in certain embodiments.

DetectANN 218 is a fully connected ANN with an input layer 402, a hidden layer (middle layer) 404, and an output layer 406. In the TSA-NoC, runtime NoC attributes are used as inputs, including buffer utilization (number of occupied virtual channels 216) for each input port (+x 202, −x 204, +y 206, −y 208, and local core 210), link utilization (value of input-flits per cycle) for each input port (+x 202', −x 204', +y 206', −y 208', and local core 210'), local operation temperature, and the previous transient error rate in the last epoch. The middle layer 404 utilizes all the attribute values and maps them to the classification of whether the corresponding component is HT-infected. The output layer 406 indicates the binary classification result: HT-free or HT-infected.

In accordance with one embodiment, a learning-based HT-mitigation mechanism was developed for high-performance and efficient HT-isolation. A bypass channel and a per-router SmartRoute controller was implemented to dynamically route high-security packets without traversing HT-infected components and utilize the bypassed routers to propagate low-security packets without degrading network performance. There is no need to restrict the transmission paths of the low-security packets, since they are already HT-infected.

When isolating HT-infected routers with bypass channels 222, the simple switch logic of the bypass channel 222 could limit the throughput of given path directions. TSA-NoC addresses this problem by intelligently balancing traffic-loads with various routing algorithms (O1TURN, West-First, and Negative-First) using a SmartRoute controller 224. The O1TURN routing dynamically applies XY or YX routing for each packet to better utilize the network spatially under normal traffic-loads. West-First and Negative-First restrict different types of turns that are allowed and achieve lower latency and less dynamic power consumption than O1TURN under intense traffic-loads. It should be noted that the TSA-NoC router has multiple virtual channels 216 to avoid both protocol and routing deadlocks.

Since the HT-detection results from DetectANN 218 vary periodically during runtime, selecting the most suitable routing algorithm that can handle the dynamic interactions between diverse traffic patterns and limited NoC resources is complex. Therefore, we use DRL to automatically balance the trade-offs among the different routing algorithms to achieve better system-level performance for high- and low-security packets. The adaptive routing algorithm is selected and applied iteratively to avoid the latency overhead due to NoC reconfiguration and packet draining during the reconfiguration process. The length of each iteration (epoch) is identical to that of DetectANN 218. At each epoch, the DRL-based SmartRoute controller 224 monitors NoC attributes and suggests an action (applying one of the routing algorithms) with the highest expected long-term return (reward), which is a function of network performance and energy-efficiency. The network attributes will change once that action is taken, resulting in a new state at the next epoch. Additionally, the changes in performance and energy metrics are also evaluated to update the reward of the selected state-action pair. The DRL-based control policy continues to evolve based on the history of router-network interactions and generates a direct map between the optimal action and a given state.

Figure 5:
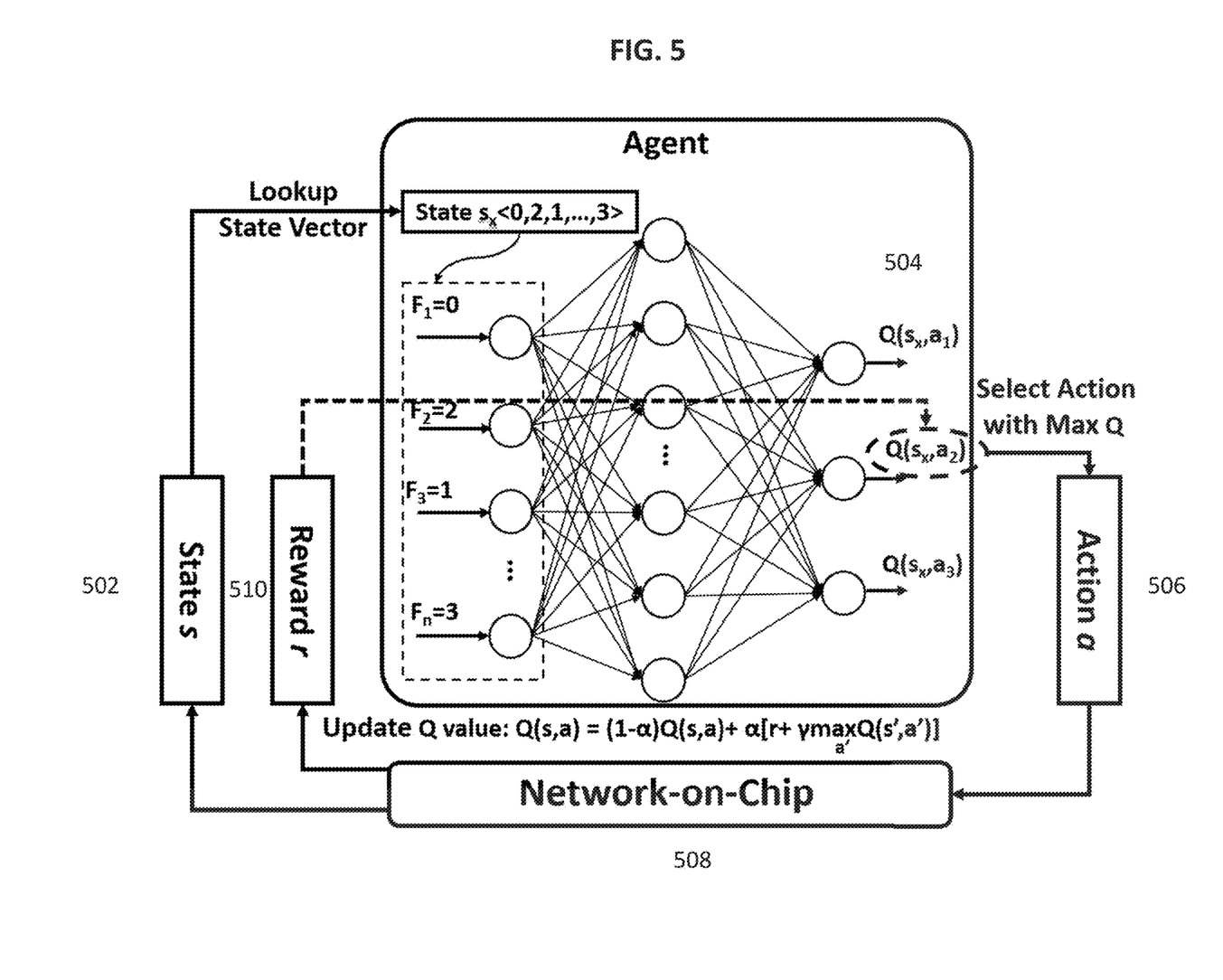
FIG. 5 is a diagram illustrating an example machine learning based control policy for an example method using deep reinforcement learning.

An exemplary DRL algorithm of a SmartRoute controller 224 is shown in FIG. 5. At each epoch, the router first observes the current state 502 using the feature values in the state vectors as inputs of the expanded ANN. The ANN then calculates the Q-values 504 of all the possible state-action pairs in the current state entry. The router suggests an action α 506, which has the maximum Q(s,a)-value for the next epoch. All routers vote with their selected actions for packets that require HT-free transmission path, and the routing algorithm with the highest score is selected. Upon taking the action α, the NoC system transitions to a new state 508. The NoC system then provides an immediate reward r 510, which is used to update Q(s,a). A five-cycle window is implemented between two consecutive epochs to inform routers of the upcoming actions and store on-the-fly flits in router buffers.

Figure 6A:
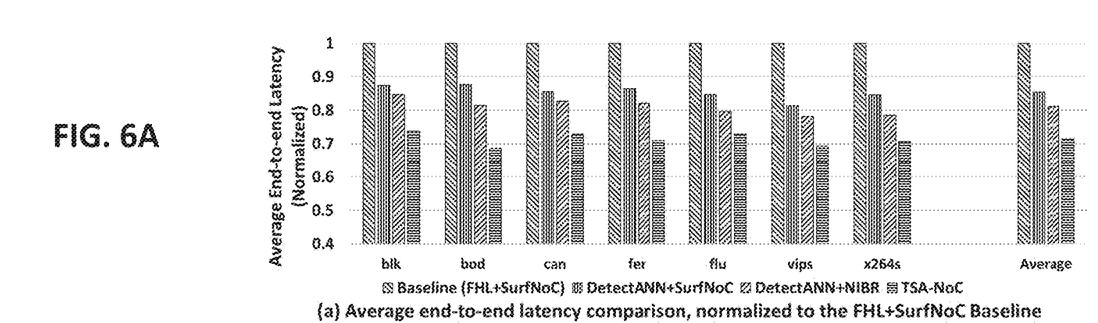
FIG. 6A is a bar chart showing average end-to-end latency (normalized) of designs in accordance with the disclosure against conventional designs.
Figure 6B:
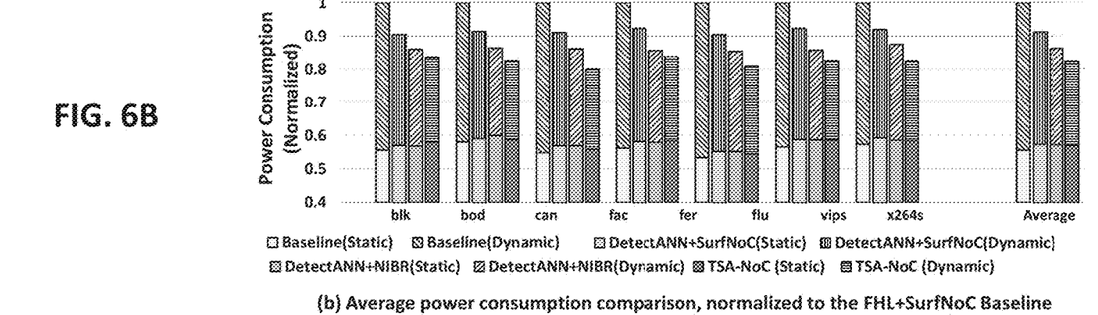
FIG. 6B is a bar chart showing the power consumption (normalized) of designs in accordance with the disclosure against conventional designs.
Figure 6C:
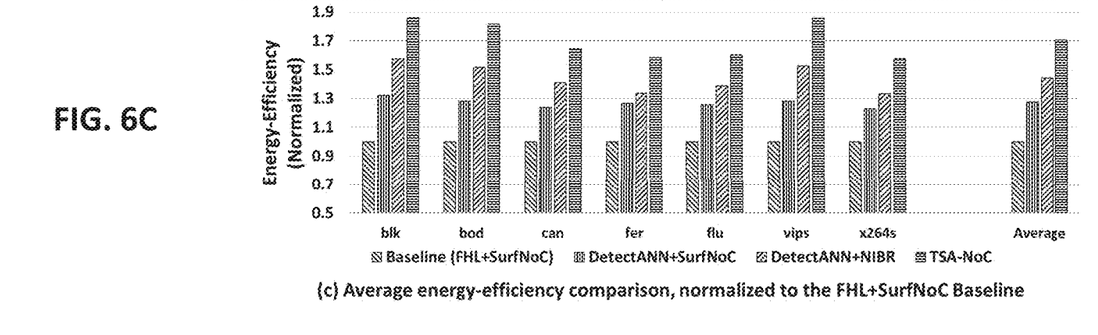
FIG. 6C is a bar chart showing the energy efficiency (normalized) of designs in accordance with the disclosure against conventional designs.

Experimental data has shown embodiments in accordance with the disclosure can achieve up to 97% attack-detection accuracy with regard to HT-detection. Moreover, the proposed attack mitigation method achieves 67% improved energy-efficiency and 28% reduced network latency, compared to state-of-the-art NoC security techniques. FIGS. 6A-6C provide experimental evidence of those improvements. To demonstrate the superiority of embodiments in accordance with the disclosure, the design was implemented in a GEM5 full system simulator, and applications from PARSEC benchmark were used for testing. Results showed that the HT detection accuracy was 96.92%. Furthermore, embodiments are scalable and can be implemented to nearly any current and future parallel computing world including mobile computing, IoT, multicore processors, embedded systems, servers, cloud computing, data centers, machine learning, etc.

FIG. 6A compares the average end-to-end latency (normalized) of designs in accordance with the disclosure, labeled "TSA-NoC," against conventional designs. As shown in FIG. 6A, designs in accordance with the disclosure show 28% reduced latency compared to conventional designs. FIG. 6B compares the power consumption (normalized) of designs in accordance with the disclosure, labeled "TSA-NoC (Static)" and "TSA-NoC (Dynamic)," against conventional designs. In FIG. 6B, power consumption is comprised of static power consumption and dynamic power consumption. In the figure, "static" means static power consumption and "dynamic" means dynamic power consumption. As shown in FIG. 6B, designs in accordance with the disclosure uniformly show reduced power consumption. FIG. 6C compares the energy efficiency (normalized) of designs in accordance with the disclosure, labeled "TSA-NoC," against conventional designs. As shown in FIG. 6C, designs in accordance with the disclosure show 67% increased energy efficiency compared to conventional designs.

The foregoing description and drawings should be considered as illustrative only of the principles of the disclosure. The disclosure is not intended to be limited by the preferred embodiment and may be implemented in a variety of ways that will be clear to one of ordinary skill in the art. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure. All references cited herein are incorporated by reference in their entirety.

The invention claimed is:

1. An on-chip router comprising:
   an on-chip input port receiving input data packets;
   an on-chip output port transmitting output data packets;
   an on-chip dynamic error detection and correction circuit having a decoder at said on-chip input port to decode and detect error at the input data packets, and an encoder at said on-chip output port to apply an error correction to the encoded data packets and output the output data packets;

an on-chip artificial neural network module;

an on-chip controller, wherein the controller instructs the artificial neural network module to detect malicious circuit modifications in the router, wherein said malicious circuit modifications comprise transient faults in the input data packets; and a bypass channel that directly connects said on-chip input port to said on-chip output port and bypass said on-chip dynamic error detection and correction circuit, wherein the artificial neural network module detects malicious circuit modifications by recognizing abnormal network behaviors caused by the transient faults, and wherein the artificial neural network module applies one or more machine learning algorithms to detect the malicious circuit modifications.

2. The on-chip router of claim 1, wherein the controller directs the router to use the bypass channel to isolate the malicious circuit modifications.

3. The on-chip router of claim 1, wherein the malicious circuit modifications are a hardware trojan.

4. The on-chip router of claim 1, wherein the one or more machine learning algorithms are selected from one or more of convolutional neural networks (CNN), deep neural networks (DNN), and generative adversarial networks (GAN).

5. A system comprising:
one or more processing cores; and
one or more on-chip routers, wherein each of the on-chip routers is comprised of an on-chip input port connected to said one or more processing cores and one or more adjacent on-chip routers, and an on-chip output port connected to said one or more processing cores and one or more adjacent on-chip routers, each of said one or more on-chip routers further comprising a on-chip dynamic error detection and correction circuit, a bypass channel that directly connects said on-chip input port to said on-chip output port and bypass said on-chip dynamic error detection and correction circuit, an artificial neural network module, and a controller;
wherein the controller instructs the artificial neural network module to detect malicious circuit modifications in the one or more on-chip routers, wherein said malicious circuit modifications comprise transient faults,
wherein the artificial neural network module detects malicious circuit modifications by recognizing abnormal network behaviors caused by the transient faults, and
wherein the artificial neural network module applies one or more machine learning algorithms to detect the malicious circuit modifications.

6. The system of claim 5, wherein the controller directs one of the one or more on-chip routers to use their bypass channels to isolate the malicious circuit modifications.

7. The system of claim 6, wherein the controller preferentially routes high-security data packets through the bypass channels of the routers to bypass said dynamic error detection and correction circuit.

8. The system of claim 5, wherein the controller applies deep reinforcement learning to route data packets through the routers.

9. The system of claim 5, wherein the controller observes the run-time attributes to automate routing data packets through the routers.

10. The system of claim 5, wherein the dynamic error detection and correction circuit is configured to perform one or more fault-tolerant methodologies to detect errors.

11. A method for on-chip network security comprising:
receiving one or more data packets at an input port at the artificial neural network module of one or more on-chip routers, wherein each on-chip router is comprised of a controller and wherein the artificial neural network is trained to detect malicious circuit modifications including transient faults in the received data packets at the input port;
analyzing runtime attributes of the data packets at the artificial neural network module;
identifying malicious circuit modifications from the run-time attributes of the data packets;
bypassing at a bypass channel, one of the one or more on-chip routers by connecting the input port to an output port of the one or more on-chip routers; and
transmitting an instruction from the controller to use the bypass channel to isolate routers in which the malicious circuit modifications are detected to directly connect the input port with an output port and bypass the router,
wherein the artificial neural network module detects malicious circuit modifications by recognizing abnormal network behaviors caused by the transient faults, and
wherein the artificial neural network module applies one or more machine learning algorithms to detect the malicious circuit modifications.

12. The method of claim 11, wherein the artificial neural network is trained using machine learning algorithms.

13. The method of claim 12, wherein the machine learning algorithms are selected from one or more of convolutional neural networks (CNN), deep neural networks (DNN), and generative adversarial networks (GAN).

14. The method of claim 11, further comprising applying switch logic to bypass and isolate routers in which the malicious circuit modifications are detected.

15. The method of claim 11, further comprising preferentially routing high-security data packets through the bypass channels of the routers.

16. The method of claim 11, further comprising applying deep reinforcement learning to route data packets through the routers.

17. The on-chip router of claim 1, wherein said artificial neural network detects transient faults to avoid misrouting and unnecessary packet re-transmissions.

* * * * *